United States Patent [19]

D'Souza

[11] Patent Number: 5,190,105

[45] Date of Patent: Mar. 2, 1993

[54] METHOD FOR IMPROVING THE STEAM SPLITS IN A MULTIPLE STEAM INJECTION PROCESS

[75] Inventor: Adrian D'Souza, Richmond, Calif.

[73] Assignee: Chevron Research and Technology Company, San Francisco, Calif.

[21] Appl. No.: 765,821

[22] Filed: Sep. 26, 1991

[51] Int. Cl.$^5$ .................... E21B 36/00; E21B 43/24
[52] U.S. Cl. ........................................ 166/303; 166/57
[58] Field of Search ............... 166/52, 57, 272, 302, 166/303, 304; 122/401; 137/561 A

[56] References Cited

U.S. PATENT DOCUMENTS

| | | | |
|---|---|---|---|
| 4,556,107 | 12/1985 | Duerksen et al. | 166/272 |
| 4,953,639 | 9/1990 | Stowe, III | 166/303 |
| 5,000,263 | 3/1991 | Stowe, III | 166/303 |
| 5,005,644 | 4/1991 | Wall et al. | 166/272 |
| 5,056,597 | 10/1991 | Stowe, III | 166/303 |

*Primary Examiner*—George A. Suchfield
*Attorney, Agent, or Firm*—Burns, Doane, Swecker & Mathis

[57] ABSTRACT

A method for enhancing the uniformity of steam quality, i.e., steam quality equalization, in a multiple steam injection system having a steam generator, a primary steam header, at least one secondary steam header, a primary steam line connecting the generator to the primary header, at least one secondary steam line connecting the primary header to a secondary steam header, and a plurality of tertiary steam lines connecting the secondary steam header to a tertiary steam header or one of a plurality of steam injections wells involves the introduction of a surfactant at a point subsequent to the steam generator. The surfactant preferably includes those alkyl aromatic sulfonates which include at least one alkyl group comprising 12-30 carbon atoms, more preferably, 20-24 carbon atoms with the preferred concentration of surfactant being about 100 to about 250 ppm, based on the total cold water equivalent of the steam flow.

13 Claims, 3 Drawing Sheets

METHOD FOR IMPROVING THE STEAM SPLITS IN A MULTIPLE STEAM INJECTION PROCESS

CROSS REFERENCE TO RELATED APPLICATION

This application is relates to application Ser. No. 07/624,781 filed Dec. 7, 1990, now U.S. Pat. No. 5,056,597, which is a continuation-in-part of application Ser. No. 533,349 filed Jun. 4, 1990, now U.S. Pat. No. 5,000,263, which is a continuation-in-part of application Ser. No. 386,525 filed Jul. 27, 1989 now U.S. Pat. No. 4,953,635, issued Sep. 4, 1990.

BACKGROUND OF THE INVENTION

The present invention relates generally to thermally enhanced oil recovery. More specifically, this invention provides a method and apparatus for improving the uniformity of steam quality equalization during multiple well injection from a common header. In the recovery of oil from reservoirs, the use of primary production techniques (i.e., the use of only initial formation energy to recover the crude oil) followed by the secondary technique of water flooding, recovers only a portion of the original present in the formation.

Moreover, the use of certain enhanced oil recovery (EOR) techniques is also known in the art. These techniques can generally be classified as either a thermally based recovery techniques, i.e., utilizing steam, or a gas drive method that can be operated in a miscible or non-miscible manner.

Methods which employ steam are effective in the enhanced recovery of oil because the steam heats the formation, lowers the viscosity of the oil, and thus, enhances the flow of oil towards a production well. Moreover, these methods have become preferred methods for enhanced recovery of low gravity, high viscosity oils because steam can cost effectively provide heat to such oils.

Ideally, the petroleum reservoir would be completely homogenous and the steam would enter all portions of the reservoir evenly. However, it is often found that this does not occur. Instead, steam selectively enters a small portion of the reservoir. Eventually, "steam breakthrough" occurs and most of the steam flows directly from an injection well to a production well, bypassing a large part of the petroleum reservoir.

It is possible to overcome this problem with various remedial measures, e.g., by plugging off certain portions of the injection well. For example, see U.S. Pat. Nos. 4,470,462 and 4,501,329, which are hereby incorporated by reference for all purposes. However, to institute these remedial measures, it is necessary to determine which portions of the reservoir are selectively receiving the injected steam. This is often a difficult problem.

Various methods have been proposed for determining how injected steam is being distributed in the wellbore. Bookout ("Injection Profiles During Steam Injection", SPE Paper No. 801-43C, May 3, 1967) summarizes some of the known methods for determining steam injection profiles and is incorporated herein by reference for all purposes.

The first and most widely used of these methods is known as a "spinner survey." A tool containing a freely rotating impeller is placed in the wellbore. As steam passes the impeller, it rotates at a rate which depends on the velocity of the steam. The rotation of the impeller is translated into a an electrical signal which is transmitted up the logging cable to the surface where it is recorded on a strip chart or other recording device.

As is well known to those skilled in the art, these spinners are greatly effected by the quality of the steam injected into the well, leading to the unreliable results or results which cannot be interpreted in any effective way.

SUMMARY OF THE INVENTION

The present invention is a method for enhancing the uniformity of steam quality (or steam quality equalization) in a multiple steam injection system comprising a steam generator, steam header, a primary steam line connecting the generator to the header, and a plurality of secondary steam lines connecting the header to a plurality of tertiary steam lines and/or a plurality of steam injection wells.

The present invention is based upon the surprising discovery that one can achieve remarkably high uniformity of steam distribution during multiple well injection from a common header by injecting and mixing a surfactant into the steam immediately before the steam enters the header. For instance, instead of achieving the poor quality splits to individual wells of 30% to 70% steam quality, one can vastly reduce the spread to, for example, a range of 64% to 69%.

The present invention comprises injecting at least one surfactant into at least one steam line, and mixing the surfactant and steam sufficiently so that a foam is formed. This surfactant can be added at any position of the distribution system subsequent to the steam generator outlet and prior to the injection wells. Preferably, the surfactant is added into the primary steam line so that the surfactant and the steam enter the header as a foam. In this embodiment, the point where the surfactant is injected into the primary steam line is preferably within seventy-five feet of the steam header, more preferably within fifty feet, still more preferably within twenty five feet of the header.

The surfactants to be employed in the present invention includes those alkyl aromatic sulfonates which include at least one alkyl group has a chain length of 12–30 carbon atoms. The chain length for the alkyl group is selected based upon the temperature of the steam such that the chosen surfactant has the minimum foam generation velocity for that steam temperature.

In one preferred embodiment involving the use of steam at above 400° F., the surfactant comprises a $C_{20}$–$C_{24}$ linear alkyl aromatic sulfonate with the preferred concentration of this surfactant being about 100 to about 250 ppm, based on the total cold water equivalent of the steam flow.

BRIEF DESCRIPTION OF THE DRAWINGS

In order to facilitate the understanding of this invention, reference will now be made to the appended drawings related to certain embodiments of the present invention. The drawings are exemplary only, and should not be construed as limiting the invention.

DETAILED DESCRIPTION OF THE PREFERRED EMBODIMENTS

The present invention relates to a method of achieving remarkably high uniformity of steam distribution quality equalization during multiple well injection from a common header by injecting and mixing a surfactant into at least one steam line.

The present invention is used in a multiple steam injection system comprising a steam generator, a steam header, a primary steam line connecting the generator to the header, and a plurality of secondary steam lines connecting the header to a plurality of steam injection wells.

By "steam generator" is meant an apparatus in which steam is formed. By "steam header" is meant a manifold for distributing steam to a plurality of steam line connecting a steam generator to a steam header. By "secondary steam line" is meant a steam connecting a steam header to a tertiary steam line or a steam injection well.

The invention method comprises injecting a surfactant into at least one steam line, and mixing the surfactant and steam sufficiently so that the surfactant and the steam form a foam.

By "surfactant" is meant a surface-active substance that is capable of foaming with steam. Example of particular surfactants include Chaser SD1020 and SD1025, which are trademarked products of Chevron Chemical Company and which have high active concentrations (50% active).

The preferred surfactants are long chain alkyl aromatic sulfonates. The alkyl aromatic sulfonates employed the present invention include those compounds where at least one of the alkyl groups comprises 12–30 carbon atoms, preferably 16–30 carbon atoms, and more preferably 18–24 carbon atoms and still more preferably 20–24 carbon atoms.

The choice of a preferred chain length for the alkyl aromatic sulfonate to be introduced into a particular steam line is dependent upon the temperature of the steam in the line. This choice can be made by looking at the minimum foam generation velocity associated with the various surfactants. Surfactants which foam at a lower velocity during sand pack tests are preferred because the velocity in steam pipes is lower than the velocity through sand pores. In particular, the at least one sulfonate which is preferred has a minimum foam generation velocity for the steam temperature in the line which is lower than that associated with alkyl aromatic sulfonates having other chain lengths in the above range.

Figure 1:
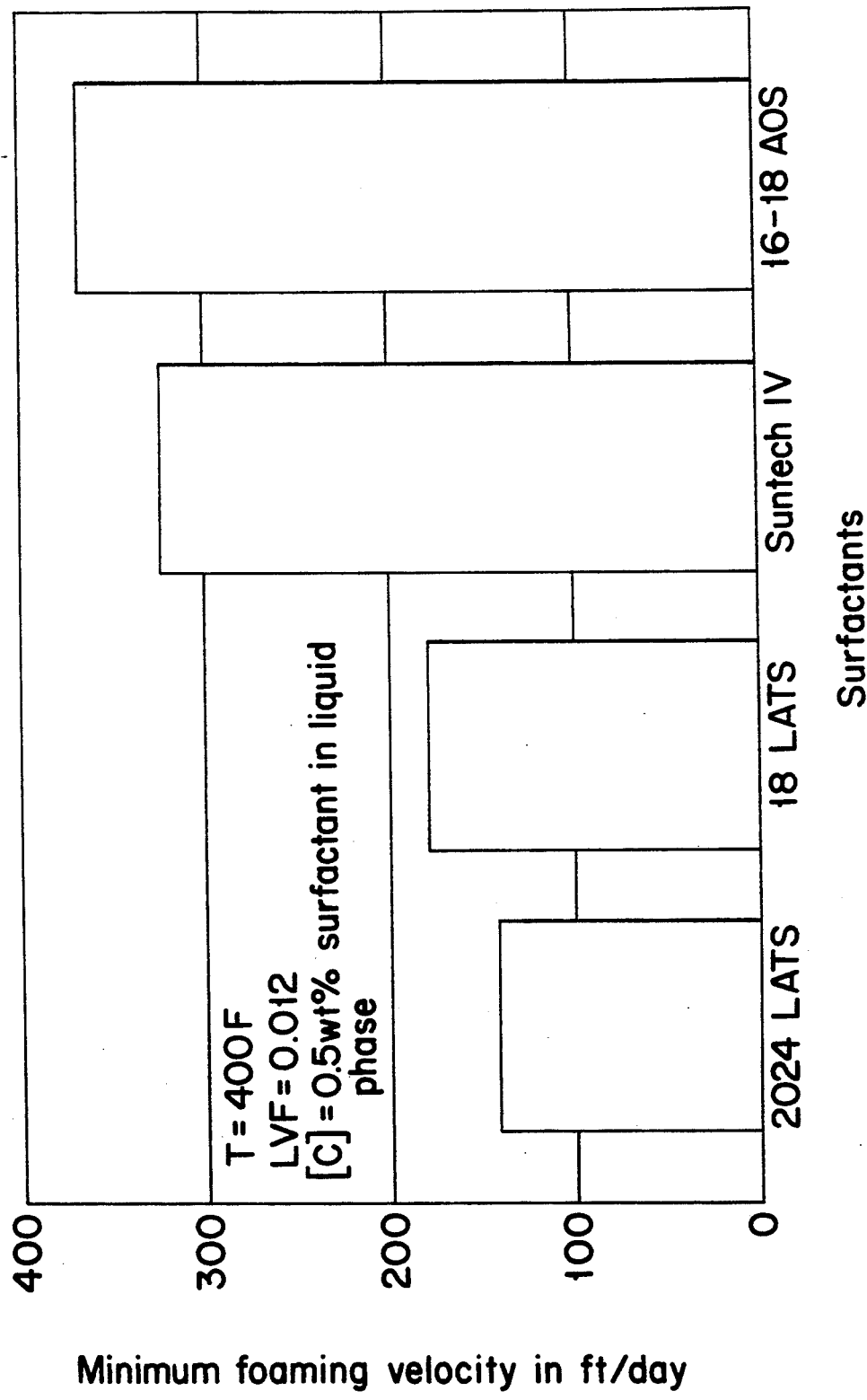
FIG. 1 is a chart illustrating the correlation between preferred carbon number for the surfactant and steam temperature.

Generally, the greater the temperature of the steam, the higher carbon number of the preferred alkyl group within the sulfonate. For example, as illustrated in FIG. 1, when a steam temperature of 400° F. is employed, a $C_{20-24}$ alkyl toluene sulfonate which has a lower minimum foaming velocity than, e.g., the $C_{18}$ linear alkyl toluene surfactant, is preferred.

The preferred alkyl group is a linear alkyl group which is derived from a linear alpha olefin such as those sold by Chevron Chemical Company, San Francisco, Calif. Alkylation of the aromatic moiety with the alpha olefin results in the linear alkyl group. Preferred alkylation catalysts are acid catalysts.

By "linear alkyl group" is meant an alkyl group having mostly secondary carbon atoms ($-CH_2-$). The linear alkyl group can also have some additional branching. However, the degree of branching is such that the linear alkyl group is substantially straight chain, that is, greater than 80 number percent of the individual carbon atoms in the alkyl substituent are either primary ($CH_3-$) or secondary ($-CH_2-$) carbon atoms, preferably, greater than 85 percent.

Examples of linear alkyl groups useful in this invention include:
n-octadecyl
n-nonadecyl
n-icosyl
n-henicosyl
n-docosyl
n-tricosyl
n-tetracosyl The alkyl group employed can also be a branched alkyl group.

By "branched alkyl group" is preferably meant an alkyl group having at least one branch of 1 (methyl), 2 (ethyl) or more carbon atoms for every 3 carbon atoms along the longest chain of the alkyl group. Thus, in preferred branched alkyl groups, the number of carbon atoms in the longest chain is divided by 3 (rounded down to the whole number) and there will be at least this number of branches in the chain. Branched alkyl groups useful in this invention may be more or less branched than the preferred, provided that they are sufficiently branched to provide the desired foam forming characteristics. For example, the branching may average as much as every 2 or 2.5 backbone carbons or at little as one branch every 3.5 or 4 backbone carbons.

Examples of preferred branched alkyl groups useful in this invention include those derived from propylene and butylene polymerization such as tetramers, and higher molecular weight oligomers.

The alkyl aromatic sulfonates useful in this invention may be relatively pure compounds or mixtures of compounds. Mixtures of compounds are preferred. The composition of the alkyl aromatic sulfonates depends on the composition of the alkylating agent. Useful alkylating agents include alkyl halides and olefins; olefins are preferred.

The starting olefins used to alkylate the aromatic moiety may have a single carbon number or may be a mixture of carbon numbers.

Often, mixtures of olefin isomers are used to alkylate the aromatic moiety. Typically, commercially available alpha olefins are mixtures of isomers which include alpha olefins, vinylidene olefins and internal olefins.

The aromatic component of the alkyl aromatic sulfonate preferably comprises benzene, ethyl benzene, toluene, xylene, cumene and naphthalene.

The sulfonate component can be present either in a water-soluble salt form comprising preferably sodium, potassium, ammonium or alkyl ammonium, or can be present in an acid form.

The concentration of surfactant employed is that concentration necessary to generate sufficient foam. Preferably, the surfactant is from about 10 ppm to about 5 wt. % (5000 ppm), based on the cold water equivalent of the steam flow, more preferably about 50 to about 5000 ppm, based on the cold water equivalent. A still more preferred concentration is from about 100 —about 250 ppm, based on the cold water equivalent of the steam flow.

This preferred concentration can also influence the chain length for the alkyl aromatic sulfonate to be employed in a given steam line. For example, if foaming is not observed at this concentration, by e.g., measurement of a slight pressure drop in a particular pipeline, one can employ an alkyl aromatic sulfonate having a higher chain length.

In addition, it is preferred that the downhole LVF, or Liquid Volume Fraction, which is defined as the ratio of the volume occupied by steam in the liquid phase to the volume occupied by the liquid and vapor phases of the injected steam at downhole conditions, be greater than 0.008. Methods for control of the LVF are known in the art, as discussed in U.S. Ser. No. 292,200, filed Dec. 20, 1988, which is incorporated herein by reference.

The surfactant can be introduced at any point during the steam distribution process subsequent to the steam generator but prior to the steam injection wells.

In one preferred embodiment, the surfactant is introduced into the steam immediately before the steam enters the header. In this embodiment, the surfactant and the steams are sufficiently mixed so that they enter the header as a foam. In another aspect of this embodiment, additional steam can be injected into a secondary steam line and the surfactant and steam are remixed before the steam enters a secondary header.

For best results the surfactant should be injected into the primary steam line within seventy-five feet of the steam header. As a general rule, the closer the injection point is to the steam header the better because the foam will return to a two phase condition if the injection point is too far from the header. Preferably, the surfactant is injected into the primary steam line within fifty feet of the steam header. More preferably, the surfactant is injected into the primary steam line within twenty-five feet of the steam header.

The present invention is especially useful where the header feeds wells of different elevations. For instance, if a secondary steam line is split into a plurality of lines, additional surfactant should be injected into one or more of the plurality of the lines and/or that secondary steam line immediately before the split. That injection of surfactant would cause the plurality of lines to have roughly the same steam quality.

Figure 2:
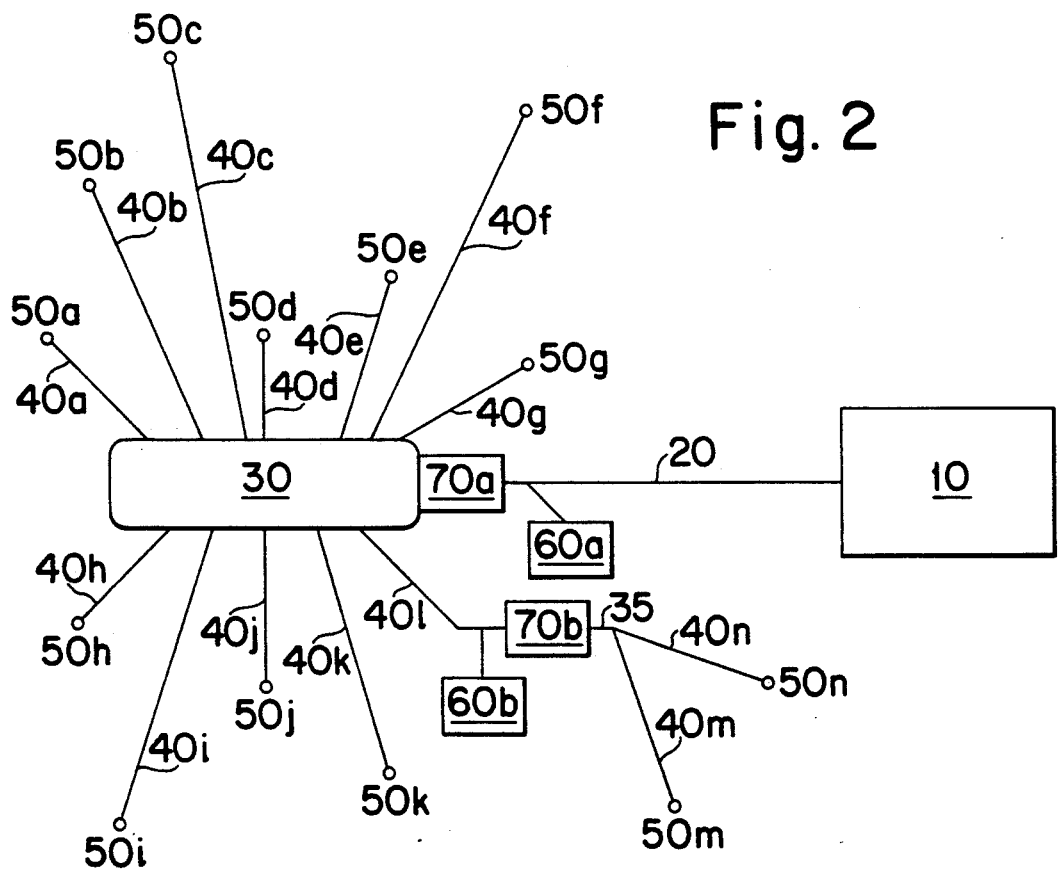
FIG. 2 is schematic drawing (not drawn to scale) of a multiple well steam injection system of the present invention.
Figure 3:
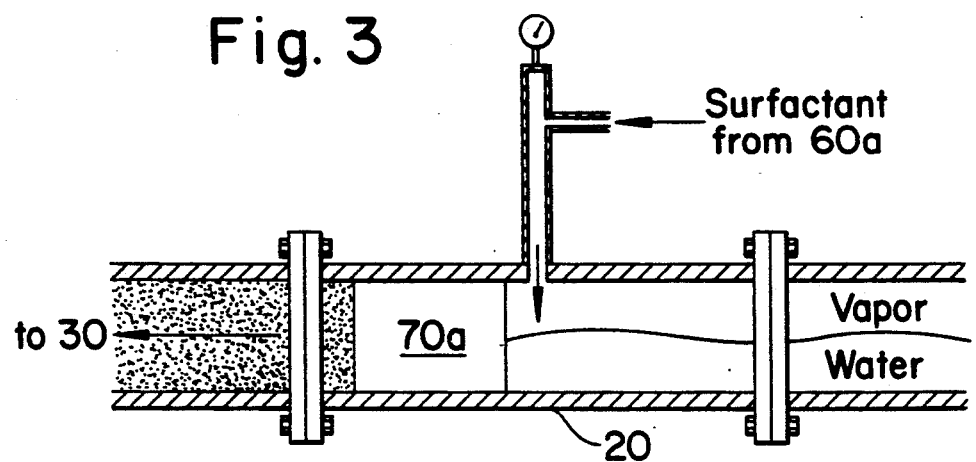
FIG. 3 is a schematic drawing of how surfactant can be injected into the multiple well steam injection system.

Referring to FIGS. 2 and 3, steam is generated in steam generator 10 and is passed through primary steam line 20 to steam header 30 where it is split and sent through secondary steam line 40a through 40l to steam injection wells 50a through 50k and wells 50m and 50n. Surfactant, which is stored in vessel 60a is injected into the primary steam line 20 and is mixed sufficiently with the steam in static mixer 70a to form an foam immediately prior to entering the steam header 30. Because of this foam, the distribution of the steam from the steam header is remarkably uniform through lines 40a through 40l. Additional surfactant, which is stored in vessel 60b, is injected in to the secondary steam line 40l and is mixed sufficiently with the steam in static mixer 70b to form an foam immediately prior to entering the steam distribution system 35. Because of this second foam, the distribution of the steam from the steam distribution system 35 is remarkably uniform through tertiary steams lines 40m through 40n which lead to the injection wells.

While static mixers are preferred for mixing the surfactant and steam in the primary steam line, orifice plates are preferably used to mix the surfactant and steam in secondary steam lines. If static mixers are used in secondary lines, the back pressure may be too great. By using orifice plates after the initial split, the necessary turbulence could be obtained without an increase in back pressure to the system.

In order to further illustrate the present invention and the advantages thereof, the following specific examples are given, it being understood that same are intended only as illustrated and in no wise limitive.

EXAMPLES

This example illustrates the shorter response times associated with the alkyl aromatic sulfonates employed within the present invention.

Figure 4:
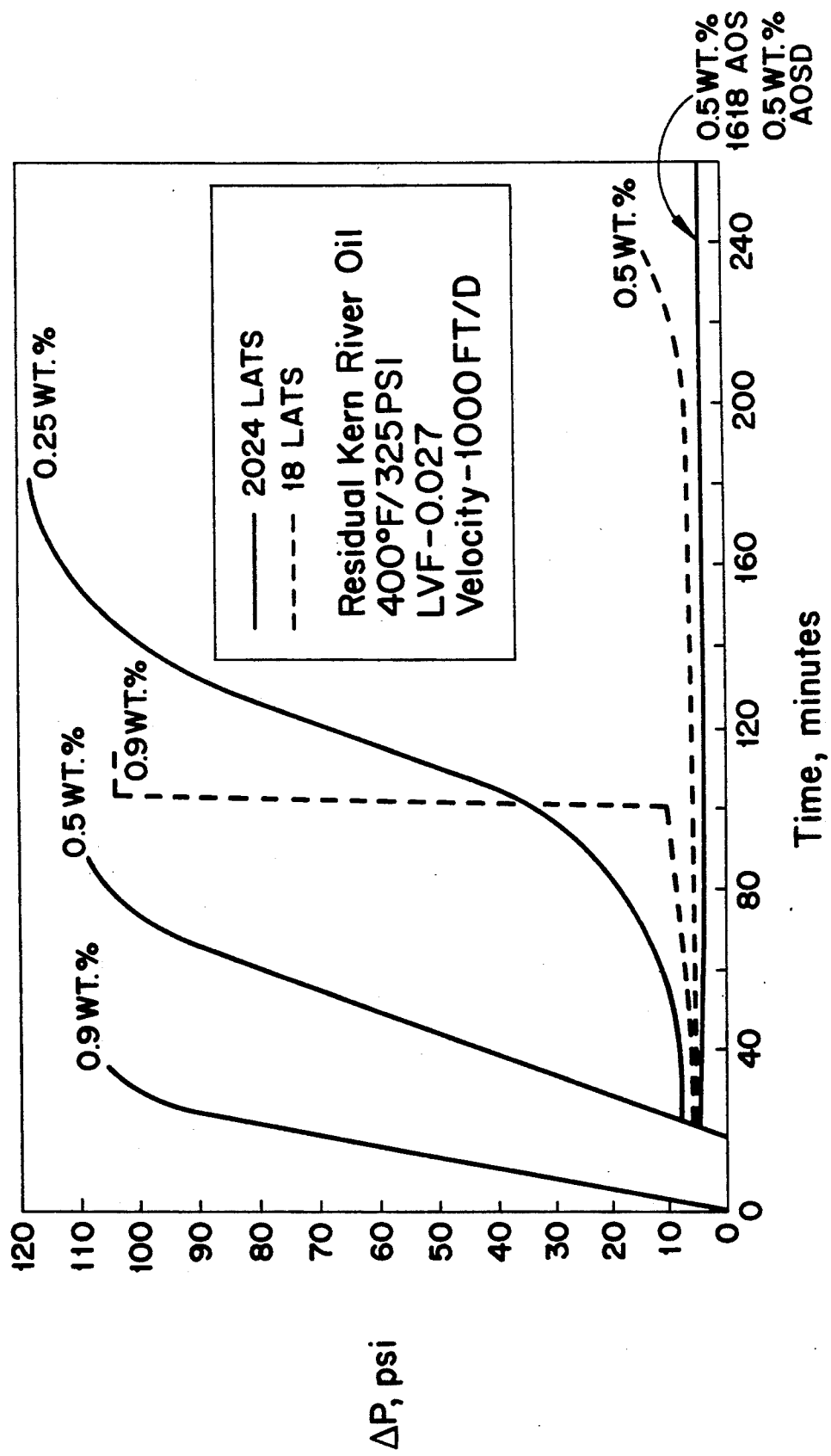
FIG. 4 is a chart illustrating the results of the Example.

Three different surfactants were employed in a sand pack foam test, the results of which are set forth in FIG. 4. The first surfactant was a combination of a $C_{16}-C_{18}$ alpha olefin sulfonate (1618 AOS) and an alpha olefin sulfonate dimer (AOSD). The second surfactant was $C_{18}$ linear alkyl toluene sulfonate (18 LATS) and the third was a $C_{20}-C_{24}$ alkyl toluene sulfonate with a linear sidechain (2024 LATS). The test conditions are given on FIG. 4. The test sequence is as follows:
1. All steps were carried out that test temperatures of 400° F.
2. Saturate the pack with steam generator feed water (SGFW).
3. Flow of 2.5 liquid per volumes (lpv) of crude oil through the packet rate of 0.5 ml/min.
4. Flow of 4 lpv of SGFW through the pack at 0.5 ml/min.
5. Start the surfactant solution.
6. Turn on the non-condensable gas (nitrogen) at the chosen rate.
7. Continue until the pressure reaches the plateau maximum.
8. Go back to step 2 for the next sample.

The results illustrated in FIG. 4 show the surprising response, i.e., quicker response time, as well as the, ability to respond at lower concentrations and thus confirm the superiority of the preferred surfactants at a temperature of 400° F.

While the present invention has been described with reference to specific embodiments, this application is intended to cover those various changes and substitutions which may be made by those skilled in the art without departing from the spirit and scope of the appended claims.

I claim:
1. A method for enhancing the uniformity of steam distribution in a multiple steam injection system comprising a steam generator, a steam header, a primary steam line connecting the generator to the header, and a plurality of secondary steam lines connecting the header to at least one tertiary headers and/or steam injection wells, the method comprising:
(a) injecting the surfactant into at least one steam line, and
(b) mixing the surfactant and steam sufficiently so as to form a foam, wherein the surfactant is an alkyl aromatic sulfonate having at least one alkyl group having a chain length of 12 to 30 carbon atoms, wherein the at least one sulfonate which is selected has a minimum foam generation velocity for the steam temperature employed which is less than that associated with alkyl aromatic sulfonates having other chain lengths in the range and further wherein the concentration of the surfactant is about 50 to about 5000 ppm based on the total cold water equivalent of the steam flow.

2. The method according to claim 1 wherein the concentration of the surfactant is about 100 to about 250 ppm based on the total cold water equivalent of the steam flow.

3. The method according to claim 1 wherein the surfactant is introduced into the steam injection system at a point after the steam generator.

4. The method according to claim 3 wherein the surfactant is introduced into the primary steam line.

5. The method according to claim 3 wherein the surfactant is introduced into the primary steam line within seventy-five feet of a steam header split.

6. The method according to claim 3 wherein the surfactant is introduced into the primary steam line within twenty-five feet of a steam header split.

7. The method according to claim 3 wherein the surfactant is introduced into at least one of the secondary steam lines prior to a subsequent split.

8. The method according to claim 3 wherein the steam is introduced at least a primary and a secondary steam lines.

9. The method according to claim 1 wherein the carbon content of the at least one alkyl group comprises 20-24 carbon atoms.

10. The method of claim 9 wherein the at least one alkyl group is a linear alkyl group or a branched alkyl group.

11. The method of claim 1 wherein the aromatic component of the alkyl aromatic sulfonate comprises benzene, ethyl benzene, toluene, xylene, cumene or naphthalene.

12. The method of claim 1 wherein the sulfonate component of alkyl aromatic sulfonate is in a water soluble salt form which comprises sodium, potassium, ammonium or an alkyl ammonium.

13. The method according to claim 1 wherein the sulfonate component of the alkyl aromatic sulfonate is in an acid form.

* * * * *